United States Patent
Onishi

(10) Patent No.: US 10,095,002 B2
(45) Date of Patent: Oct. 9, 2018

(54) LENS BARREL AND CAMERA DEVICE

(71) Applicant: Panasonic Intellectual Property Management Co., Ltd., Osaka (JP)

(72) Inventor: Hideo Onishi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 37 days.

(21) Appl. No.: 15/451,588

(22) Filed: Mar. 7, 2017

(65) Prior Publication Data

US 2017/0276899 A1    Sep. 28, 2017

(30) Foreign Application Priority Data

Mar. 24, 2016 (JP) .................. 2016-060978
Jan. 17, 2017 (JP) .................. 2017-005552

(51) Int. Cl.
*G02B 7/09* (2006.01)
*G02B 7/04* (2006.01)

(52) U.S. Cl.
CPC ............. *G02B 7/09* (2013.01); *G02B 7/04* (2013.01)

(58) Field of Classification Search
CPC .................................. G02B 7/09; G02B 7/04
See application file for complete search history.

(56) References Cited

U.S. PATENT DOCUMENTS

| 4,626,077 A | 12/1986 | Yamamoto |
| 2009/0323208 A1 | 12/2009 | Kurosawa |

FOREIGN PATENT DOCUMENTS

| JP | 60-002063 | 1/1985 |
| JP | 2010-011572 | 1/2010 |
| JP | 2011-081426 | 4/2011 |

*Primary Examiner* — Jack Dinh
(74) *Attorney, Agent, or Firm* — McDermott Will & Emery LLP

(57) ABSTRACT

A lens barrel includes a fixed frame, an annular operation ring rotatable with respect to the fixed frame, a drive frame rotatable together with the operation ring with respect to the fixed frame, a mobile frame movable together with lens held by the mobile frame along an optical axis direction based on a rotation of the drive frame, a coil array fixed to any one of the fixed frame and the drive frame and composed of a plurality of coils disposed alongside in a circumferential direction, and a magnet array fixed to the other of the fixed frame and the drive frame and composed of a plurality of magnets disposed alongside in the circumferential direction, in which the drive frame is rotated by electromagnetic force generated by supplying a current to the coil array, and the mobile frame is driven along the optical axis direction.

10 Claims, 12 Drawing Sheets

LENS BARREL AND CAMERA DEVICE

BACKGROUND

1. Technical Field

The present disclosure relates to a lens barrel and a camera device including the lens barrel.

2. Description of the Related Art

Conventionally, in a case where a zooming operation is electrically performed in a lens barrel, a lens is moved in the lens barrel by a combination of a direct-current motor and a gear. However, when the direct-current motor and the gear are combined, the lens barrel is increased in size and a loud sound is generated. Thus, it is proposed to use an ultrasonic motor in the lens barrel so that operation sound can be relatively reduced. Furthermore, as disclosed in Unexamined Japanese Patent Publication No. 2010-11572, it is proposed to use a rotatable actuator in the lens barrel.

SUMMARY

It is an object of the present disclosure to provide a lens barrel which is reduced in size, and a camera device including the lens barrel.

A lens barrel in the present disclosure includes a cylindrical fixed frame, an annular operation ring disposed outside the fixed frame coaxially with the fixed frame and rotatable with respect to the fixed frame, a drive frame disposed inside the fixed frame coaxially with the fixed frame and rotatable together with the operation ring with respect to the fixed frame, a mobile frame movable together with lens held by the mobile frame along an optical axis direction, based on a rotation of the drive frame, a coil array fixed to any one of the fixed frame and the drive frame and composed of a plurality of coils disposed alongside in a circumferential direction, and a magnet array fixed to the other of the fixed frame and the drive frame and composed of a plurality of magnets disposed alongside in the circumferential direction. Thus, the drive frame is rotated with respect to the fixed frame by electromagnetic force generated by supplying a current to the coil array, and the mobile frame is driven along the optical axis direction.

DETAILED DESCRIPTION

Figure 1:
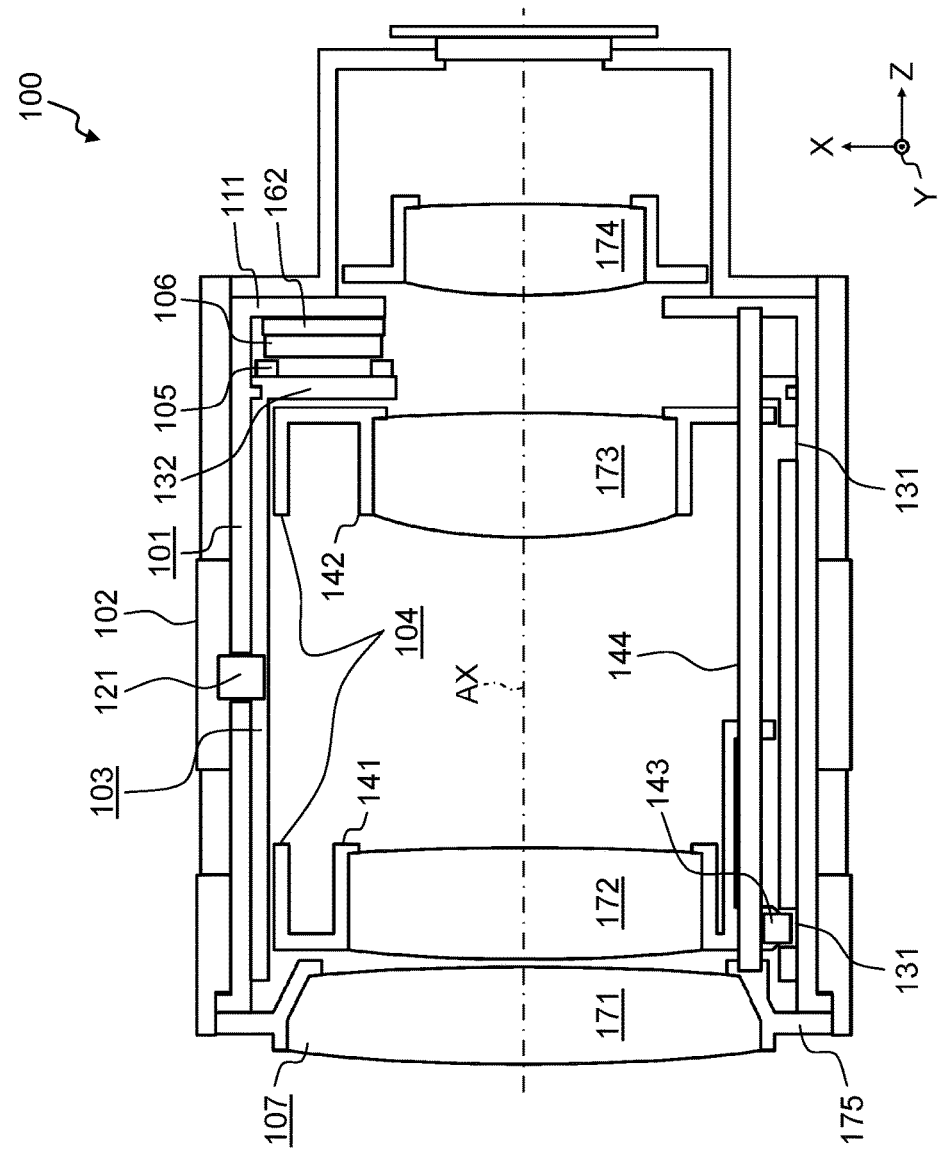
FIG. 1 is a cross-sectional view illustrating a lens barrel in a first exemplary embodiment.

Next, exemplary embodiments for a lens barrel and a camera device in the present disclosure will be described with reference to the drawings. In addition, each of the following exemplary embodiments only shows one example of the lens barrel and the camera device in the present disclosure. Therefore, the present disclosure is defined by claims with reference to the following exemplary embodiments and not limited to the following exemplary embodiments. Thus, among components in the following exemplary embodiments, those which are not contained in an independent claim representing the most significant concept in the present disclosure are not always needed to achieve the object of the present disclosure, but they are described to configure a more preferable embodiment.

Furthermore, the drawing is a schematic view in which exaggeration, omission, and rate adjustment are made to some extent in order to describe the present disclosure, so that a shape, a positional relationship, and a rate are sometimes different from actual ones.

EXEMPLARY EMBODIMENTS

First Exemplary Embodiment

FIG. 1 is a cross-sectional view illustrating a lens barrel in this exemplary embodiment.

Figure 2:
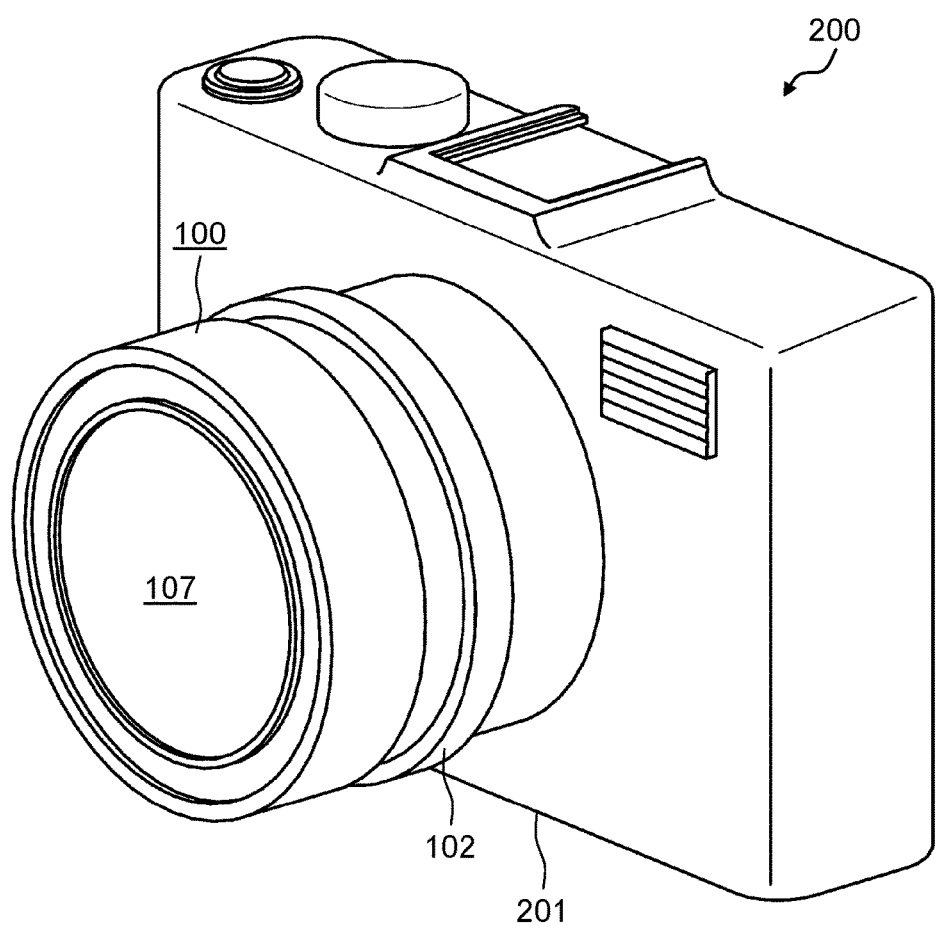
FIG. 2 is a perspective view illustrating a state in which the lens barrel in the first exemplary embodiment is fixed to a camera body as an interchangeable lens of a camera device.

FIG. 2 is a perspective view illustrating a state in which the lens barrel in this exemplary embodiment is fixed to a camera body as an interchangeable lens of a camera device.

As illustrated in FIGS. 1 and 2, lens barrel 100 houses lens system 107 such that the lens system can be partially moved in an optical axis direction based on an operation mode such as a manual mode or an electric mode. Lens barrel 100 includes fixed frame 101, operation ring 102, drive frame 103, mobile frame 104, coil array 105, and magnet array 106.

Furthermore, optical axis AX of lens barrel 100 is illustrated in FIG. 1. In addition, an optical axis AX direction means a direction extending along optical axis AX, and in this exemplary embodiment, this direction is parallel to a tube axis of lens barrel 100. Furthermore, a direction which is vertical to optical axis AX or vertical to an axis parallel to optical axis AX is referred to as a radial direction.

Fixed frame 101 is a cylindrical member and serves as a structural member functioning as a base for operations of other members. Furthermore, in a case where lens barrel 100 is the interchangeable lens of camera device 200 such as a mirrorless camera, fixed frame 101 is fixed to cameral body 201.

In this exemplary embodiment, fixed frame 101 has an annular fixed flange 111 inwardly expanding at an end on a side close to an image in the optical axis AX direction. Furthermore, magnet array 106 is fixed to fixed flange 111 of fixed frame 101.

Furthermore, operation ring 102 is disposed outside fixed frame 101 and serves as a short annular member disposed coaxially with fixed frame 101. In this exemplary embodiment, operation ring 102 is disposed around fixed frame 101 coaxially with fixed frame 101 so as to be rotatable with respect to fixed frame 101.

In this exemplary embodiment, when operation ring 102 is manually rotated in a manual mode, a lens in lens barrel 100 is moved along optical axis AX so that an angle of view can be changed (zoomed). More specifically, operation ring 102 is connected to drive frame 103 through connection pin 121, and when operation ring 102 is rotated outside fixed frame 101, drive frame 103 disposed inside fixed frame 101 can be rotated with respect to fixed frame 101.

Here, drive frame 103 is disposed inside fixed frame 101 and serves as a cylindrical member disposed coaxially with fixed frame 101. As described above, drive frame 103 is connected to operation ring 102 through connection pin 121 and rotated together with operation ring 102 when operation ring 102 is rotated with respect to fixed frame 101.

Drive frame 103 is a member functioning as a cam to move mobile frame 104 and has a spiral groove (including a slit) to move mobile frame 104 along optical axis AX when drive frame 103 is rotated.

In this exemplary embodiment, drive frame 103 has fan-shaped drive flange 132 inwardly expanding at its end on the side close to the image in the optical axis AX direction. Coil array 105 is fixed to drive flange 132 of drive frame 103 so as to face magnet array 106.

Mobile frame 104 is an annular member in an overall view and is moved along the optical axis AX direction together with a lens held by mobile frame 104 when drive frame 103 is rotated. In this exemplary embodiment, lens barrel 100 includes first mobile frame 141 and second mobile frame 142 as mobile frames 104, and first mobile frame 141 holds second lens 172 and second mobile frame 142 holds third lens 173 in lens system 107.

Mobile frame 104 includes cam follower 143 which is engaged in groove 131 of drive frame 103 functioning as the cam. Furthermore, mobile frame 104 is slidably engaged with guide pole 144 in order to ensure smooth and straight movement of mobile frame 104. Here, guide pole 144 is a pole member disposed inside drive frame 103 along optical axis AX and its one end is fixed to fixed flange 111 of fixed frame 101 while its other end is fixed to holding frame 175 of first lens 171.

Figure 3:
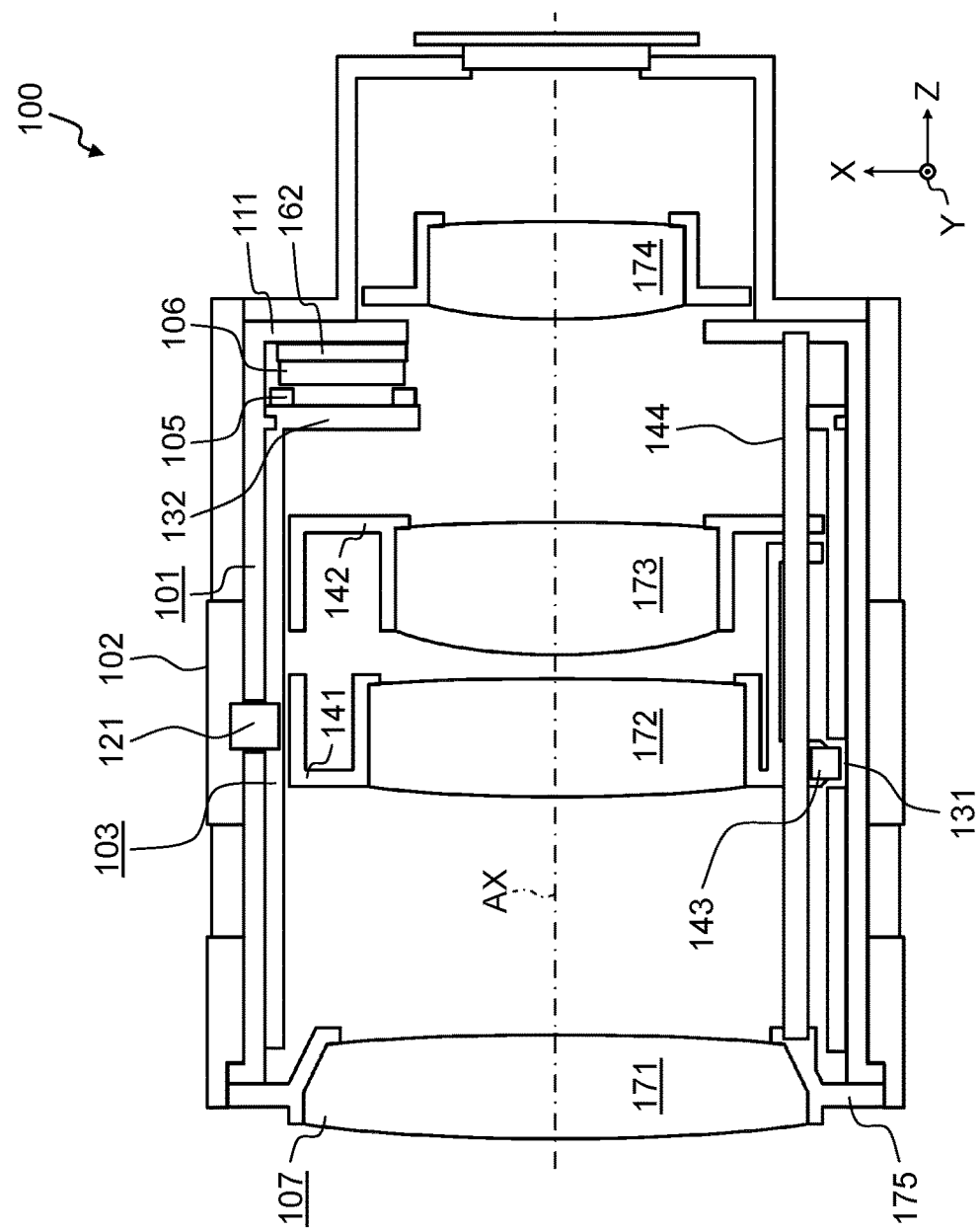
FIG. 3 is a cross sectional view illustrating a state in which a drive frame is rotated to move a mobile frame to another position in an optical axis direction from the state illustrated in FIG. 1.

FIG. 3 is a cross-sectional view illustrating a state where first mobile frame 141 and second mobile frame 142 are moved to other positions in the optical axis direction by rotating drive frame 103 from the state in FIG. 1.

As illustrated in FIG. 3, in lens barrel 100 in this exemplary embodiment, when drive frame 103 is rotated, first mobile frame 141 and second mobile frame 142 are moved in the optical axis AX direction and a distance between second lens 172 and third lens 173 is increased (wide-angle shooting) or reduced (telescopic shooting), so that the angle of view can be changed.

Next, a description will be given of coil array 105 and magnet array 106 to electrically operate drive frame 103.

Figure 4:
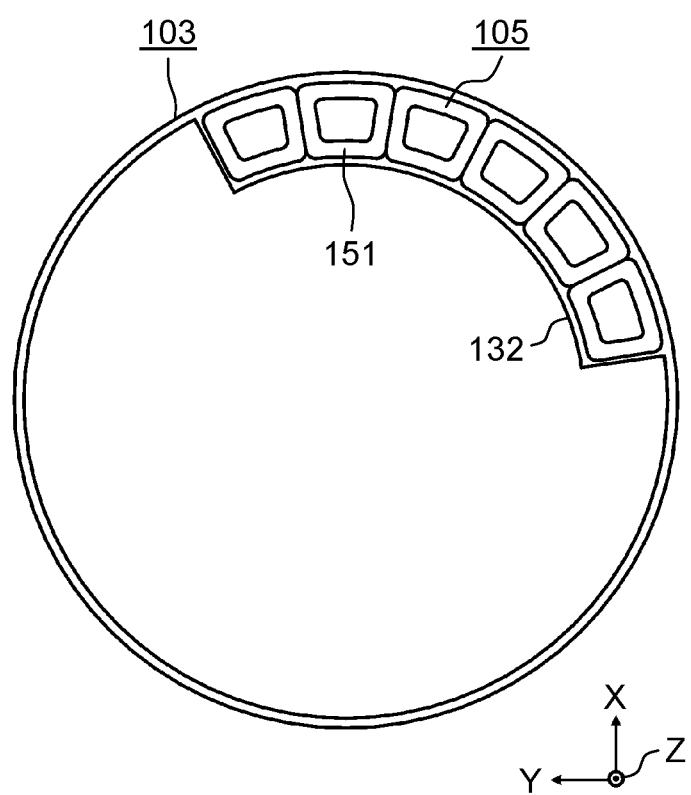
FIG. 4 is a plan view illustrating a coil array and the drive frame in the first exemplary embodiment taken from a side close to an image.

FIG. 4 is a plan view illustrating coil array 105 and drive frame 103 taken from the side close to the image.

As illustrated in FIG. 4, coil array 105 is fixed to drive flange 132 of drive frame 103 on the side close to the image in the optical axis AX direction and composed of a plurality of coils 151 disposed alongside in a circumferential direction. In this exemplary embodiment, coil 151 is wound into a trapezoidal shape corresponding to a partially cut fan shape, and coil array 105 composed of coils 151 disposed alongside is also formed into a trapezoidal shape corresponding to a partially cut fan shape as a whole. Furthermore, the trapezoidal shape of coil array 105 almost coincides with a trapezoidal shape of drive flange 132. Thus, an electric wire can be spatially effectively wired in coil 151, so that a magnetic field can be effectively generated.

Furthermore, a number of coils 151 in coil array 105 is equal to the integral multiple of three (six in this exemplary embodiment), and wiring is made so that energizing timing for at least three adjacent coils 151 can be separately controlled.

Furthermore, in this exemplary embodiment, a coil axis (z-axis direction in the drawing) of coil 151 extends along optical axis AX. In other words, the coil axis of coil 151 intersects with an arrangement direction of magnets 161 which will be described below. Furthermore, the coil 151 is provided in a state in which the electric wire is wound around a bobbin having a trapezoidal shape corresponding to a partially cut fan shape.

Here, the coil axis means a central axis of the coil.

In addition, in this exemplary embodiment, coil array 105 is fixed to drive frame 103 and functions as a mobile member, but coil array 105 may be fixed to fixed frame 101 and function as a fixed member.

Figure 5:
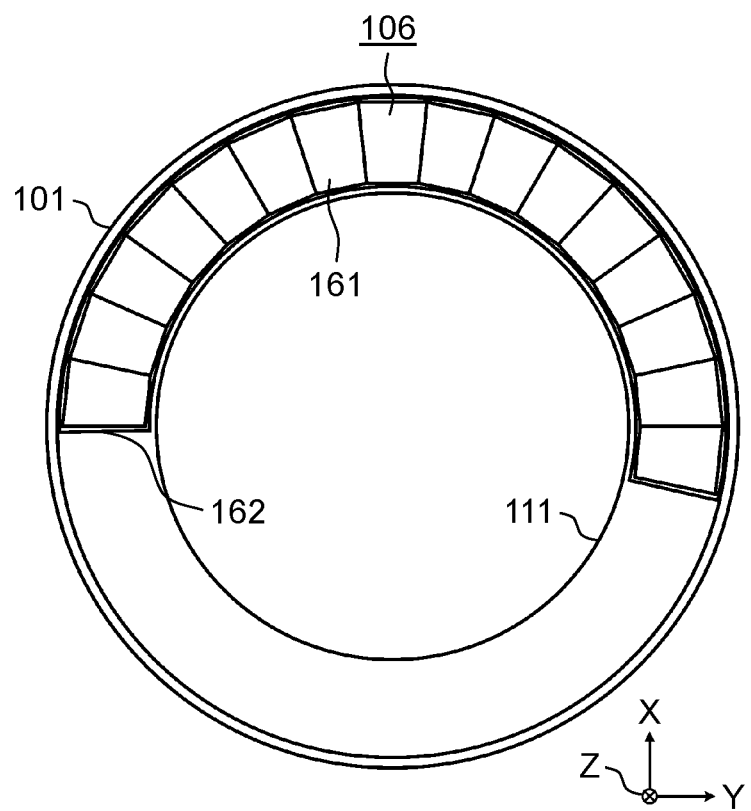
FIG. 5 is a plan view illustrating a magnet array and the fixed frame in the first exemplary embodiment taken from a side close to an object.

FIG. 5 is a plan view illustrating magnet array 106 and fixed frame 101 taken from a side close to an object.

As illustrated in FIG. 5, magnet array 106 is fixed to fixed flange 111 of fixed frame 101 on the side close to the object in the optical axis AX direction. Magnet array 106 is a member composed of a plurality of magnets 161 disposed alongside in the circumferential direction. In this exemplary embodiment, magnets 161 are disposed so that poles of adjacent magnets 161 are opposite to each other. That is, magnet array 106 is a so-called multipolar magnet. Therefore, in magnet array 106, an S pole and an N pole are alternately provided in the circumferential direction at predetermined pitches.

Thus, magnet array 106 heavier than coil array 105 is fixed to fixed frame 101, so that torque to rotate drive frame 103 can be low. Furthermore, operation ring 102 can be operated with ease in the manual mode.

Furthermore, the magnet array 106 has a trapezoidal shape corresponding to a partially cut fan shape. A boundary surface between adjacent magnets 161 extends along optical axis AX.

Magnet 161 has a width smaller than coil 151 in the circumferential direction. That is, a number of magnets 161 is set greater than the number of coils 151 disposed over a length of coil array 105 in the circumferential direction illustrated in FIG. 4. In this embodiment, while the number of coils 151 is six, about eight magnets 161 are disposed over the corresponding length in the circumferential direction. Furthermore, yoke 162 having almost the same shape as magnet array 106 in a planar view (XY plane in the drawing) is provided on a surface of magnet array 106 opposite to a surface facing coil array 105. When plurality of magnets 161 are fixed to yoke 162, magnet array 106 can be stable in structure, and a strong magnetic field can be applied to coil array 105.

Furthermore, in this exemplary embodiment, magnet array 106 is fixed to fixed frame 101 and functions as a fixed member, but magnet array 106 may be fixed to drive frame 103 and function as a movable member.

Figure 6:
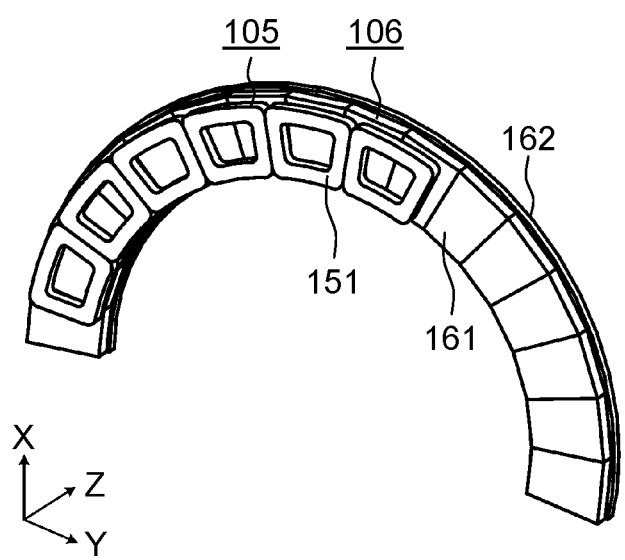
FIG. 6 is a perspective view illustrating a relationship between the coil array and the magnet array in the first exemplary embodiment.

FIG. 6 is a perspective view illustrating a relationship between coil array 105 and magnet array 106.

As illustrated in FIG. 6, coil array 105 and magnet array 106 are disposed alongside in parallel along optical axis AX with a slight space provided between them. In addition, a curvature radius of coil array 105 coincides with a curvature radius of magnet array 106, and coil array 105 is rotated around an axis which passes through the center of a circle of curvature and which is along optical axis AX.

In addition, a surface of coil array 105 faces a surface of magnet array 106. Furthermore, a pitch between the N pole and the S pole of the magnets 161 is smaller than a pitch between adjacent coil axes.

In this configuration, coil array 105 and magnet array 106 function as a motor (rotation actuator). That is, a current is supplied to any of coils 151 in coil array 105, and to which coil 151 a current should be supplied is sequentially changed so as to change a magnetic flux generated from coil array 105. As a result, electromagnetic force is generated by a mutual effect of a magnetic flux generated from magnet array 106 and the magnetic flux generated from coil array 105, so that drive frame 103 to which coil array 105 is fixed can be rotated with respect to fixed frame 101 to which magnet array 106 is fixed. Thus, when drive frame 103 functioning as the cam is rotated, mobile frame 104 having cam follower 143 is moved (reciprocally) between the state illustrated in FIG. 1 and the state illustrated in FIG. 3 along the optical axis AX direction, so that a zooming operation can be performed.

Thus, lens barrel 100 in this exemplary embodiment described above can be extremely simple in structure without needing a direct-current motor or a reduction gear. Therefore, while lens barrel 100 can electrically perform the zooming operation, lens barrel 100 can be small in size (especially thin in a radial direction) and light in weight. Furthermore, in the manual mode in which coil array 105 is supplied with no power or low power, the zooming operation can be performed by lightly rotating operation ring 102 and smoothly rotating drive frame 103. Furthermore, there is no contact between coil array 105 and magnet array 106, so that loud sound is not generated when the zooming operation is performed electrically and a silent operation can be realized. That is, the operation seems like an operation in a linear motor, so that the operation can be continuously performed from an ultralow-speed drive to a high-speed drive. That is, lens barrel 100 can realize both high followability due to the smooth operability in the manual mode, and silent high-speed zooming ability in the electric mode.

Second Exemplary Embodiment

Next, another exemplary embodiment of lens barrel 100 will be described. In addition, the same reference mark is affixed to a part having the same effect or function or the same shape or mechanism as in the first exemplary embodiment and a description of such a part is occasionally omitted. Furthermore, hereinafter, a description will be mainly given of a point different from the first exemplary embodiment, and a description of the same contents is occasionally omitted.

Figure 7:
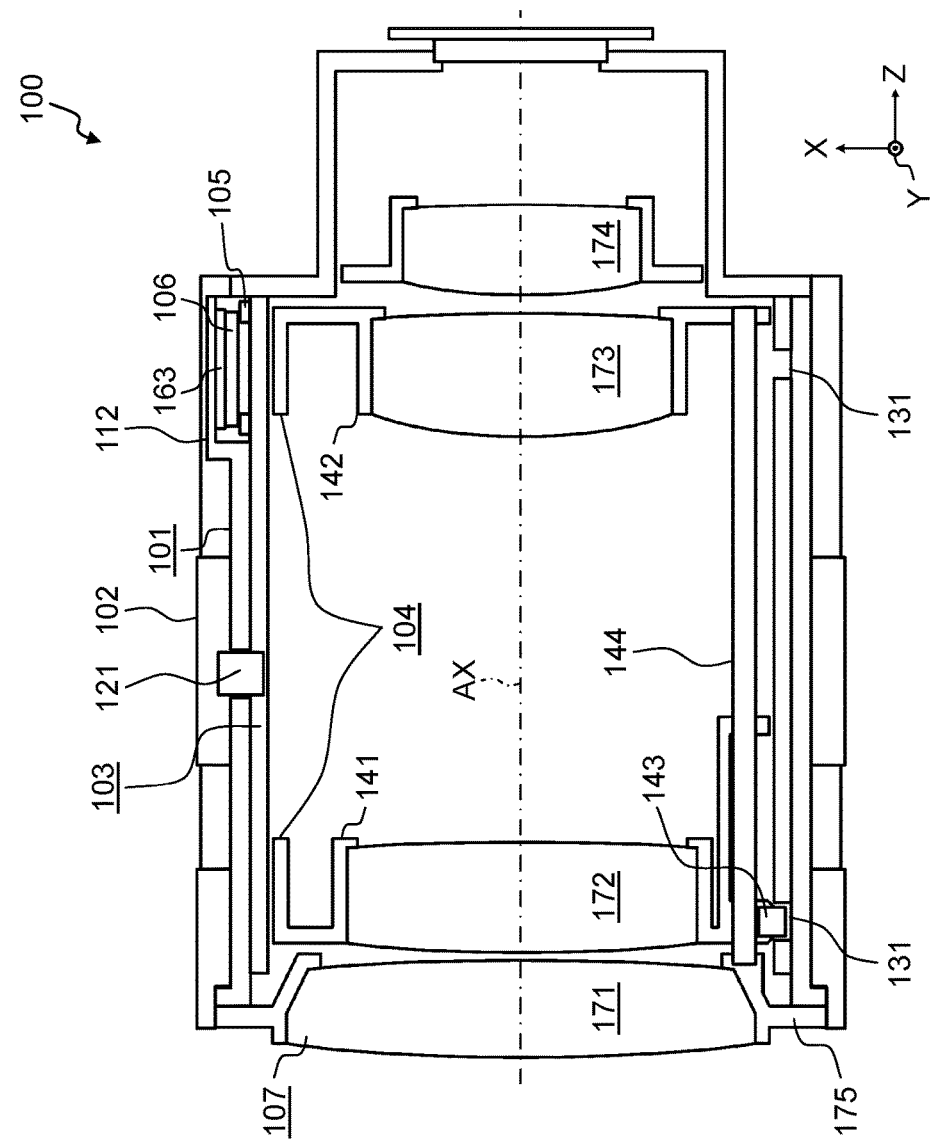
FIG. 7 is a cross-sectional view illustrating a lens barrel in a second exemplary embodiment.

FIG. 7 is a cross-sectional view illustrating the lens barrel in this exemplary embodiment.

As illustrated in FIG. 7, lens barrel 100 in this embodiment is different from that in the first exemplary embodiment mainly in shape of coil array 105, shape of magnet array 106, and their locations.

Fixed frame 101 does not have fixed flange 111 but has, at an end on a side close to an image, a radius-enlarged portion 112 expanding in a direction in which a radius is increased. Magnet array 106 is fixed to radius-enlarged portion 112 of fixed frame 101, and radius-enlarged portion 112 houses coil array 105 and yoke 162 as well as magnet array 106 in a space provided radially outside drive frame 103.

In this exemplary embodiment, drive frame 103 does not have drive flange 132, and coil array 105 is fixed to an outer circumferential surface at an end on the side close to the image in an optical axis AX direction.

Figure 8:
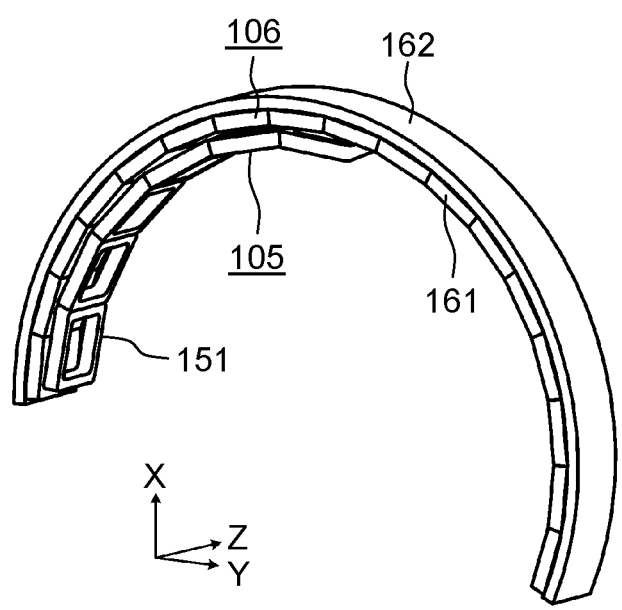
FIG. 8 is a perspective view illustrating a relationship between a coil array and a magnet array in the second exemplary embodiment.

FIG. 8 is a perspective view illustrating a relationship between the coil array and the magnet array.

As illustrated in FIG. 8, coil array 105 is fixed to the outer circumferential surface of drive frame 103 at the end on the side close to the image in the optical axis direction, and coil array 105 is composed of a plurality of coils 151 disposed alongside in a circumferential direction. Coil 151 is wound into a rectangular shape, and coil array 105 including the plurality of coils 151 disposed alongside has a shape of a circular arc.

Furthermore, coil array 105 is composed of six coils 151, and energizing timing for at least three adjacent coils 151 can be separately controlled similar to the first exemplary embodiment.

Furthermore, each coil 151 is set so that its coil axis intersects with optical axis AX (at right angles in this exemplary embodiment).

Magnet array 106 and yoke 162 are fixed to an inner circumferential surface of radius-enlarged portion 112 radially expanding from fixed frame 101, and magnet array 106 is composed of a plurality of magnets 161 disposed alongside in the circumferential direction. Each magnet 161 is disposed so that a magnet axis intersects with optical axis AX (at right angles in this exemplary embodiment).

In addition, magnet array 106 has a shape of a circular arc larger than coil array 105.

Furthermore, similar to the first exemplary embodiment, about eight magnets 161 are arranged over a length corresponding to a length of coil array 105. In addition, yoke 162 having a shape of a circular arc is disposed coaxially with magnet array 106, on a surface of magnet array 106 opposite to a surface facing coil array 105.

As illustrated in FIG. 8, coil array 105 and magnet array 106 are disposed alongside in parallel along a radius direction with a slight space provided between them. In addition, a curvature radius of coil array 105 coincides with a curvature radius of magnet array 106, and coil array 105 is rotated around an axis which passes through the center of a circle of curvature and which is along optical axis AX.

Furthermore, the coil axis of coil 151 extends toward optical axis AX. A surface of coil array 105 faces a surface of magnet array 106. Furthermore, a pitch between an N pole and an S pole of magnets 161 is smaller than a pitch between adjacent coil axes.

In this configuration, coil array 105 and magnet array 106 function as a motor (rotation actuator). That is, a current is supplied to any of coils 151 in coil array 105, and to which coil 151 a current should be supplied is sequentially changed so as to change a magnetic flux generated from coil array 105. As a result, electromagnetic force is generated by a mutual effect of a magnetic flux generated from magnet array 106 and the magnetic flux generated from coil array 105, and drive frame 103 to which coil array 105 is fixed can be rotated with respect to fixed frame 101 to which magnet array 106 is fixed. Thus, when drive frame 103 functioning as the cam is rotated, mobile frame 104 having cam follower 143 is moved along an optical axis AX direction so that a zooming operation is performed. This sequential operation is similar to the moving operation (reciprocally) between the state illustrated in FIG. 1 and the state illustrated in FIG. 3 in the first exemplary embodiment.

Thus, lens barrel 100 in this embodiment achieves the same effect as the first exemplary embodiment described above except that lens barrel 100 can be small in size (especially short in the optical axis direction).

Third Exemplary Embodiment

Next, an embodiment of a camera device will be described. In addition, the same reference mark is affixed to a part having the same effect or function or the same shape or mechanism as in the first and second exemplary embodiments, and a description of such a part is occasionally omitted. Furthermore, hereinafter, a description will be mainly given of a point different from the first and second exemplary embodiments, and a description of the same contents is occasionally omitted.

Figure 9:
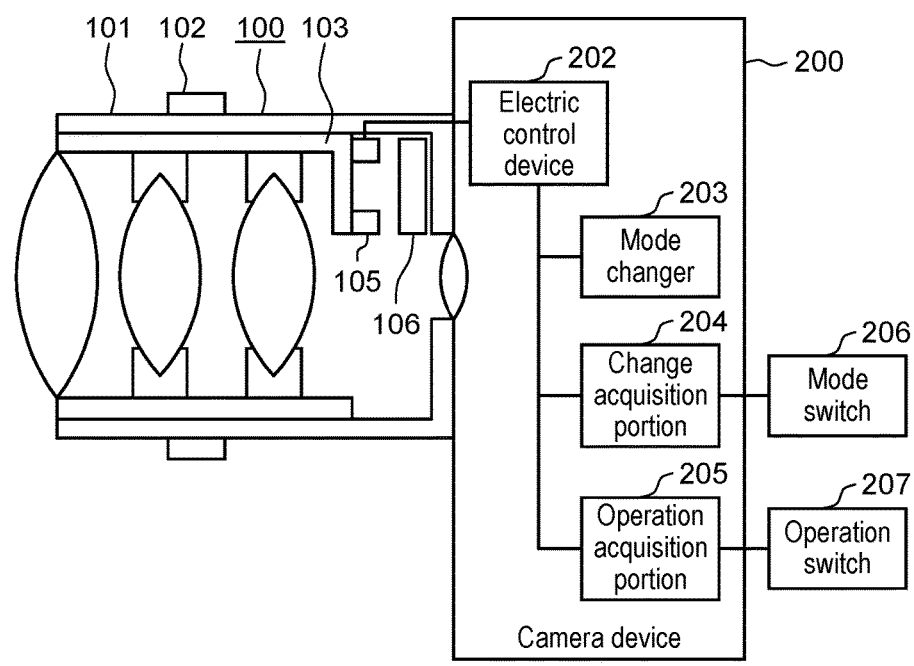
FIG. 9 is a block diagram illustrating a functional configuration and a mechanical portion of a camera device.

FIG. 9 is a block diagram illustrating a functional configuration of the camera device together with its mechanical portion.

As illustrated in FIG. 9, camera device 200 is an imaging device including lens barrel 100 and includes electric control device 202, mode changer 203, change acquisition portion 204, and operation acquisition portion 205.

Change acquisition portion 204 is a process portion to acquire information from mode switch 206 when an operator presses mode switch 206 in camera device 200. Here, change acquisition portion 204 acquires information of an electric mode or a manual mode from mode switch 206.

Mode changer 203 is a process portion to change the mode in camera device 200 to the electric mode or the manual mode, based on the information acquired by change acquisition portion 204. More specifically, in a case where the mode is changed to the manual mode, electric control device 202 stops or reduces a current to be supplied to coil array 105. Meanwhile, in a case of the electric mode, operation acquisition portion 205 is operated to acquire an input from operation switch 207.

Operation acquisition portion 205 is a process portion to acquire operation information from operation switch 207. The operation information includes information of a zooming operation to set lens barrel 100 in a telescopic state or a wide-angle state, and information of a focusing operation to move a focus lens.

In the electric mode, electric control device 202 supplies a current to coil array 105 based on the operation information acquired by operation acquisition portion 205 and drives drive frame 103 in a rotation direction according to the operation information.

Thus, camera device 200 can be operated such that in the manual mode, the zooming operation or the focusing operation can be performed with high followability by manually rotating operation ring 102, and in the electric mode, the lens can be moved silently and quickly.

Furthermore, the present disclosure is not limited to the above exemplary embodiments. For example, another embodiment which appropriately combines the above components or excludes some of the above components described in this specification may be regarded as the exemplary embodiment of the present disclosure. In addition, the present disclosure includes a variation which is variously varied from the above exemplary embodiments by the person skilled in the art without departing from the scope of the present disclosure, that is, the meaning described in claims.

Figure 10:
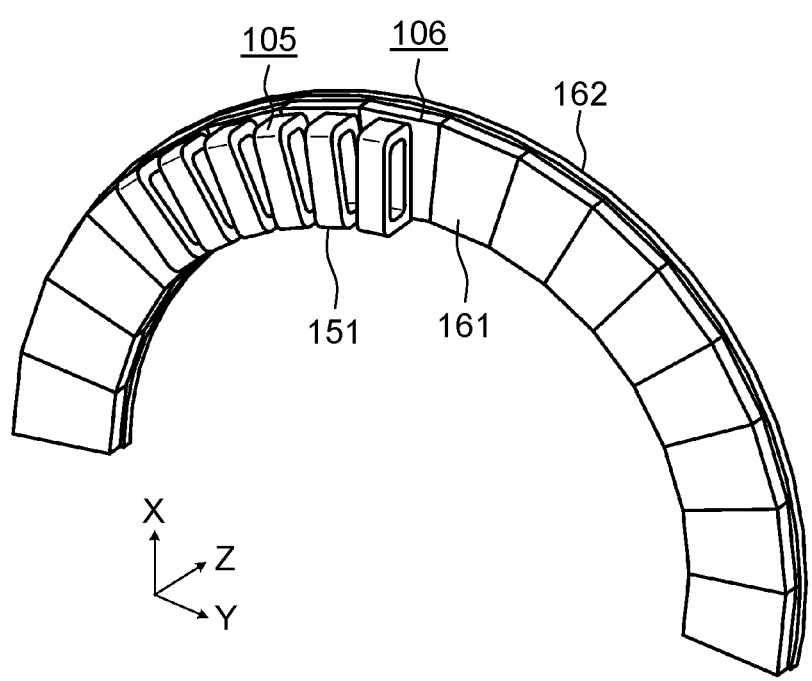
FIG. 10 is a perspective view illustrating a relationship between a coil array and a magnet array in Variation 1.

FIG. 10 is a perspective view illustrating a relationship between coil array 105 and magnet array 106 in Variation 1. As illustrated in FIG. 10, magnet 161 in magnet array 106 is disposed so that a magnet axis is along optical axis AX (Z-axis direction in the drawing). Meanwhile, coil array 105 is disposed alongside magnet array 106 along an optical axis AX direction. Furthermore, a coil axis of coil 151 in coil array 105 extends in a direction intersecting with optical axis AX. More specifically, the coil axis of coil 151 extends along a tangent line to an outer circumference of magnet array 106 disposed in a circumferential direction. Lens barrel 100 may have the above relationship between coil array 105 and magnet array 106.

Figure 11:
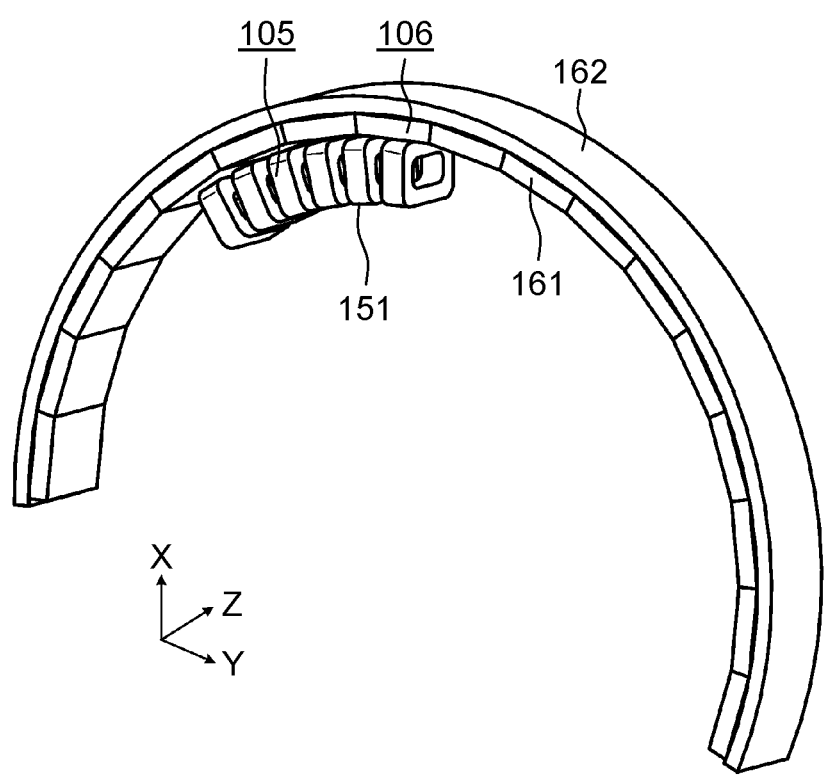
FIG. 11 is a perspective view illustrating a relationship between a coil array and a magnet array in Variation 2.

FIG. 11 is a perspective view illustrating a relationship between coil array 105 and magnet array 106 in a Variation 2. As illustrated in FIG. 11, magnet 161 in magnet array 106 is disposed to face yoke 162 formed into an annular shape. Meanwhile, coil array 105 is disposed on an inner circumferential side of magnet array 106 along a circumferential direction. A coil axis of coil 151 in coil array 105 extends in a direction intersecting with optical axis AX, that is, along a tangent line to the circumferential direction. Lens barrel 100 may have the above relationship between coil array 105 and magnet array 106.

Figure 12:
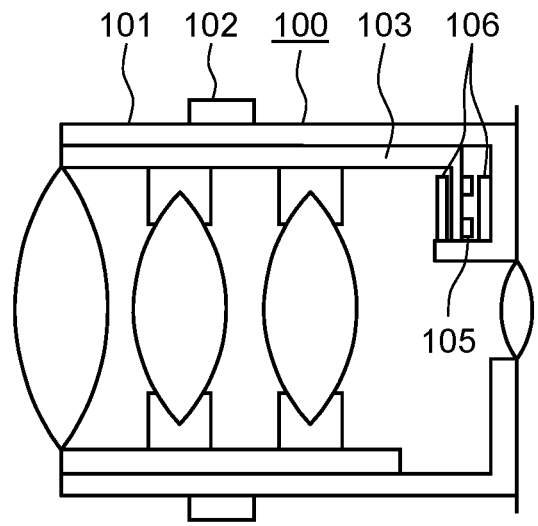
FIG. 12 is a perspective view illustrating a relationship between a coil array and a magnet array in Variation 3.
Figure 13:
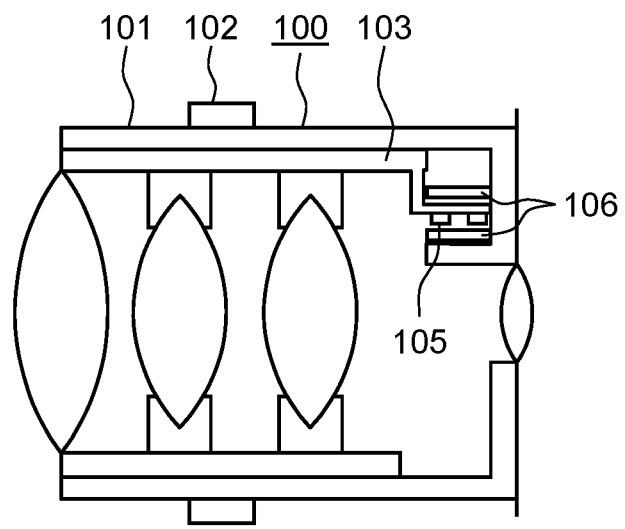
FIG. 13 is a perspective view illustrating a relationship between a coil array and a magnet array in Variation 4.

FIG. 12 is a cross-sectional view illustrating a relationship between coil array 105 and magnet array 106 in Variation 3. FIG. 13 is a cross-sectional view illustrating a relationship between coil array 105 and magnet array 106 in Variation 4. As illustrated in FIGS. 12 and 13, a plurality of magnet arrays 106 may be provided to sandwich coil array 105. Thus, a strong magnetic field can be generated from the plurality of magnet arrays 106, so that strong torque can be generated, and a current to be supplied to coil array 105 can be reduced for energy saving.

The lens barrel described above may be applied to an interchangeable lens of a still camera or a video camera.

What is claimed is:
1. A lens barrel comprising:
a cylindrical fixed frame;
an annular operation ring disposed outside the fixed frame coaxially with the fixed frame and rotatable with respect to the fixed frame;
a drive frame disposed inside the fixed frame coaxially with the fixed frame and rotatable together with the operation ring with respect to the fixed frame;
a mobile frame movable together with a lens held by the mobile frame along an optical axis direction, based on a rotation of the drive frame;
a coil array fixed to any one of the fixed frame and the drive frame and composed of a plurality of coils disposed alongside in a circumferential direction; and
a magnet array fixed to the other of the fixed frame and the drive frame and composed of a plurality of magnets disposed alongside in the circumferential direction,
wherein the drive frame is rotated with respect to the fixed frame by electromagnetic force generated by supplying a current to the coil array, and the mobile frame is driven along the optical axis direction.

2. The lens barrel according to claim 1, wherein the coil array and the magnet array are disposed alongside in the optical axis direction.

3. The lens barrel according to claim 1, wherein the coil array and the magnet array are disposed alongside in a radial direction.

4. The lens barrel according to claim 1, wherein a coil axis of the coil intersects with an arrangement direction of the plurality of magnets.

5. The lens barrel according to claim 1, wherein a coil axis of the coil extends along a tangent line to the circumferential direction of an arrangement direction of the plurality of magnets.

6. The lens barrel according to claim 1, wherein the coil array is disposed on the drive frame.

7. The lens barrel according to claim 1, wherein each of the plurality of coils is wounded into a trapezoidal shape.

8. The lens barrel according to claim 1, further comprising a plurality of the magnet arrays disposed to sandwich the coil array.

9. The lens barrel according to claim 1, wherein the coil array is provided on the drive frame on a side close to an image in the optical axis direction.

10. A camera device comprising:
the lens barrel according to claim 1; and
an electric control device,
wherein
in an electric mode, the electric control device drives the drive frame by electromagnetic force generated by supplying a current to the coil array based on acquired operation information, and in a manual mode, the electric control device stops or reduces a current to be supplied to the coil array.

* * * * *